US012600643B2

(12) United States Patent
Yamada et al.

(10) Patent No.: US 12,600,643 B2
(45) Date of Patent: Apr. 14, 2026

(54) POWDER FOR ADDITIVE MANUFACTURING

(71) Applicant: Resonac Corporation, Tokyo (JP)

(72) Inventors: Yusuke Yamada, Tokyo (JP); Hiroshi Tsuzuki, Tokyo (JP); Hiroki Sugimoto, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/866,272

(22) PCT Filed: Dec. 20, 2023

(86) PCT No.: PCT/JP2023/045654
§ 371 (c)(1),
(2) Date: Nov. 15, 2024

(87) PCT Pub. No.: WO2024/143099
PCT Pub. Date: Jul. 4, 2024

(65) Prior Publication Data
US 2025/0162948 A1      May 22, 2025

(30) Foreign Application Priority Data

Dec. 26, 2022    (JP) ................................. 2022-208408
Dec. 26, 2022    (JP) ................................. 2022-208468

(51) Int. Cl.
| | |
|---|---|
| *C01F 7/021* | (2022.01) |
| *B28B 1/00* | (2006.01) |
| *C01F 7/02* | (2022.01) |
| *C04B 35/111* | (2006.01) |
| *C04B 35/63* | (2006.01) |
| *C04B 35/64* | (2006.01) |
| *B33Y 10/00* | (2015.01) |
| *B33Y 70/00* | (2020.01) |
| *B33Y 80/00* | (2015.01) |

(52) U.S. Cl.
CPC .............. *C01F 7/021* (2013.01); *B28B 1/001* (2013.01); *C01F 7/02* (2013.01); *C04B 35/1115* (2013.01); *C04B 35/63* (2013.01); *C04B 35/64* (2013.01); *B33Y 10/00* (2014.12); *B33Y 70/00* (2014.12); *B33Y 80/00* (2014.12); *C01P 2004/32* (2013.01); *C01P 2004/51* (2013.01); *C01P 2004/61* (2013.01); *C01P*

*2006/10* (2013.01); *C01P 2006/11* (2013.01); *C01P 2006/12* (2013.01); *C04B 2235/528* (2013.01); *C04B 2235/5436* (2013.01); *C04B 2235/5472* (2013.01)

(58) Field of Classification Search
CPC . C01F 7/021; C01F 7/02; B28B 1/001; C04B 35/1115; C04B 35/63; C04B 35/64
See application file for complete search history.

(56) References Cited

U.S. PATENT DOCUMENTS

| | | | |
|---|---|---|---|
| 2020/0115284 A1 | 4/2020 | Hoel et al. | |
| 2021/0171814 A1* | 6/2021 | Sarangi ................ | C04B 35/638 |
| 2021/0394265 A1 | 12/2021 | Rushkin et al. | |
| 2022/0250149 A1 | 8/2022 | Gibson et al. | |

FOREIGN PATENT DOCUMENTS

| | | |
|---|---|---|
| CN | 109311759 A | 2/2019 |
| JP | 2016-117069 A | 6/2016 |
| JP | 2016-182697 A | 10/2016 |
| JP | 2018-130835 A | 8/2018 |
| JP | 2019-513900 A | 5/2019 |
| JP | 2019-525967 A | 9/2019 |
| JP | 2021-011050 A | 2/2021 |
| WO | 2021/002040 A1 | 1/2021 |
| WO | 2022/091978 A1 | 5/2022 |

OTHER PUBLICATIONS

Written Opinion for PCT/JP2023/045654 dated Mar. 26, 2024 (PCT/ISA/237).
Michele Lanzetta et al., "Improved surface finish in 3D printing using bimodal powder distribution", Rapid Prototyping Journal, 2003, vol. 9, No. 3, pp. 157-166 (10 pages total).
Deuk Yong Lee et al., "Effect of alumina particle size and distribution on infiltration rate and fracture toughness of alumina-glass composites prepared by melt infiltration" Materials Science & Engineering, 2003, vol. A341, pp. 98-105 (8 pages total).
Huang Shilan et al., "Effect of Alumina Powder Particle Size Distribution on Shrinkage", Electric porcelain arrester, Dec. 31, 1998, vol. 164, Issue 4, pp. 25-27 (6 pages total).

* cited by examiner

*Primary Examiner* — James A Fiorito
(74) *Attorney, Agent, or Firm* — Sughrue Mion, PLLC

(57) ABSTRACT

A powder for additive manufacturing which is an inorganic oxide powder, wherein D10 is 1.0 to 4.0 μm, D50 is 5.5 to 9.0 μm, D90 is 20.0 to 40.0 μm, and the volume ratio of particles having a particle size of 16.8 to 60.0 μm is 15.0 to 22.0 vol %.

12 Claims, No Drawings

POWDER FOR ADDITIVE MANUFACTURING

CROSS REFERENCE TO RELATED APPLICATIONS

This application is a National Stage of International Application No. PCT/JP2023/045654 filed Dec. 20, 2023, claiming priority based on Japanese Patent Application No. 2022-208468 filed Dec. 26, 2022 and Japanese Patent Application No. 2022-208408 filed Dec. 26, 2022.

TECHNICAL FIELD

The present disclosure relates to an additive manufacturing powder, a sintered body thereof, and a method for producing a binder-jet additively manufactured article.

BACKGROUND

In recent years, a processing method called additive manufacturing (AM) technology, 3D printing technology, or the like has attracted attention. This is a technique for obtaining a target manufactured article by preparing and layering a sectional shape based on three-dimensional shape data on the target manufactured article. As the additive manufacturing techniques, there are known processing methods, such as binder jetting (Patent Literature 1) in which a binder is injected onto a powder material at a manufacturing stage to selectively manufacture a manufactured article, material jetting in which a photocurable resin or the like is injected from an ink jet nozzle to selectively manufacture a manufactured article, powder bed fusion in which a powder bed spread with a metal powder or the like is irradiated with a laser or an electron beam to selectively melt the powder and manufacture a manufactured article, and stereolithography (Patent Literature 2) in which a slurry obtained by mixing a liquid photocurable resin and an inorganic powder is irradiated with light in order to create a manufactured article.

CITATION LIST

Patent Literature

[PTL 1] JP 2016-117069 A
[PTL 2] JP 2021-11050 A

SUMMARY OF INVENTION

Technical Problem

Binder jetting is also known by the term "3D ink jet powder printing". The method includes, for example, a step of supplying a powder material to a manufacturing stage using a roller to form a uniform powder layer, and a step of applying a liquid binder to the powder layer by an inkjet printhead to selectively bind portions of the powder layer. By repeating these steps, a target three-dimensional additively manufactured article can be obtained. Thereafter, the three-dimensional additively manufactured article is subjected to a sintering treatment, as necessary. In binder jetting, a structure, in which the distribution of constituent materials is non-uniform, such as voids, may be generated in the obtained three-dimensional additively manufactured article. In order to suppress this, it is desirable for the additive manufacturing powder to have a favorable laying property so that it can be smoothly supplied to the manufacturing stage and can be uniformly laid. In addition, it is believed that a highly uniform three-dimensional additively manufactured article can be obtained by filling the additive manufacturing powder at a high density. In order to achieve favorable laying property and high density filling, it is useful to increase the fluidity of the powder material. On the other hand, when the binder is applied, it is also required that the powder layer not be disturbed and that the binder can penetrate into the powder material. Furthermore, it is also desired that the shrinkage rate during sintering be low.

The present disclosure provides a material that, as an additive manufacturing powder, has appropriate fluidity which achieves both favorable laying property capable of forming a uniform powder layer and shape stability capable of maintaining a shape from application of a binder to a sintering treatment, and an appropriate bulk density which allows a binder to penetrate into powder material and realizes a low shrinkage rate during sintering.

Solution to Problem

The present inventors have found that fluidity and bulk density of an additive manufacturing powder can be controlled to an appropriate range by controlling the volume ratio of particles having a relatively large particle diameter within a specific range in the additive manufacturing powder. Furthermore, the present inventors have found that by blending two kinds of inorganic oxide powders having different particle size distributions at a predetermined ratio, fluidity and bulk density of the powder material can be controlled to an appropriate range.

The content of the present disclosure relates to the following matters.

[1]
An additive manufacturing powder that is an inorganic oxide powder,
wherein D10 is 1.0 to 4.0 μm, D50 is 5.5 to 9.0 μm, and D90 is 20.0 to 40.0 μm, and
a volume ratio of a particle having a particle diameter of 16.8 to 60.0 μm is 15.0 to 22.0% by volume.

[2]
The additive manufacturing powder according to aspect [1], wherein a volume ratio of a particle having a particle diameter of 2.0 μm or more is 90.0 to 100% by volume.

[3]
The additive manufacturing powder according to aspect [1] or [2], wherein a ratio of D50 to D10 (D50/D10) is 2.0 to 2.2, and
a ratio of D90 to D10 (D90/D10) is 6.0 to 8.0.

[4]
The additive manufacturing powder according to any one of aspects [1] to [3], wherein a BET specific surface area is 0.1 to 10.0 m²/g.

[5]
The additive manufacturing powder according to any one of aspects [1] to [4], wherein the powder is spherical in shape.

[6]
The additive manufacturing powder according to any one of aspects [1] to [5], which is alumina.

[7]
The additive manufacturing powder according to aspect [6], wherein a press-molding bulk density under a pressure of 98 MPa is 2.52 to 2.54 g/cm³.

[8]

The additive manufacturing powder according to any one of aspects [1] to [7] for use in binder jetting.

[9]

A sintered body of the additive manufacturing powder according to any one of aspects [1] to [7].

A method for producing a binder-jet additively manufactured article, the method comprising: applying a liquid containing a binder to the additive manufacturing powder according to any one of aspects [1] to [7] to form a three-dimensional additively manufactured article.

A method for producing a sintered body, the method comprising: applying a liquid containing a binder to the additive manufacturing powder according to any one of aspects [1] to [7] to form a three-dimensional additively manufactured article; and carrying out a sintering treatment on the three-dimensional additively manufactured article.

[12]

An additive manufacturing powder comprising: a coarse-grained inorganic oxide powder (A) having a D50 of 9.0 to 25.0 μm, and a fine-grained inorganic oxide powder (B) having a D50 smaller than that of the coarse-grained inorganic oxide powder (A), wherein a volume ratio of the coarse-grained inorganic oxide powder (A) to a total volume of the coarse-grained inorganic oxide powder (A) and the fine-grained inorganic oxide powder (B) is 9.5 to 29.0% by volume.

[13]

The additive manufacturing powder according to aspect [12], wherein a particle diameter volume ratio of the coarse-grained inorganic oxide powder (A) to the fine-grained inorganic oxide powder (B) is 0.26 to 1.15.

[14]

The additive manufacturing powder according to aspect [12] or [13], wherein D50 ($D_A50$) of the coarse-grained inorganic oxide powder (A) and D50 ($D_B50$) of the fine-grained inorganic oxide powder (B) satisfy $D_A50-D_B50 \geq 3.5$ μm.

[15]

An additive manufacturing powder comprising: a coarse-grained inorganic oxide powder (A) having a D50 of 9.0 to 25.0 μm, and a fine-grained inorganic oxide powder (B) having a D50 smaller than that of the coarse-grained inorganic oxide powder (A), wherein a particle diameter volume ratio of the coarse-grained inorganic oxide powder (A) to the fine-grained inorganic oxide powder (B) is 0.26 to 1.15.

[16]

The additive manufacturing powder according to aspect [15], wherein a volume ratio of the coarse-grained inorganic oxide powder (A) to a total volume of the coarse-grained inorganic oxide powder (A) and the fine-grained inorganic oxide powder (B) is 9.5 to 29.0% by volume.

[17]

The additive manufacturing powder according to aspect [15] or [16], wherein D50 ($D_A50$) of the coarse-grained inorganic oxide powder (A) and D50 ($D_B50$) of the fine-grained inorganic oxide powder (B) satisfy $D_A50-D_B50 \geq 3.5$ μm.

[18]

The additive manufacturing powder according to any one of aspects [12] to [17], wherein D50 of the fine-grained inorganic oxide powder (B) is 5.0 to 8.0 μm.

[19]

The additive manufacturing powder according to any one of aspects [12] to [18], wherein a ratio of D50 to D10 (D50/D10) of the coarse-grained inorganic oxide powder (A) is 1.5 to 3.5, and a ratio of D90 to D10 (D90/D10) of the coarse-grained inorganic oxide powder (A) is 4.0 to 7.0.

[20]

The additive manufacturing powder according to any one of aspects [12] to [19], wherein both the coarse-grained inorganic oxide powder (A) and the fine-grained inorganic oxide powder (B) are spherical in shape.

[21]

The additive manufacturing powder according to any one of aspects [12] to [20], wherein both the coarse-grained inorganic oxide powder (A) and the fine-grained inorganic oxide powder (B) are alumina.

[22]

The additive manufacturing powder according to aspect [21], wherein a press-molding bulk density under a pressure of 98 MPa is 2.52 to 2.54 g/cm$^3$.

[23]

The additive manufacturing powder according to any one of aspects [12] to [22] for use in binder jetting.

[24]

A sintered body of the additive manufacturing powder according to any one of aspects to [23].

[25]

A method for producing a binder-jet additively manufactured article, the method comprising: applying a liquid containing a binder to the additive manufacturing powder according to any one of aspects [12] to [23] to form a three-dimensional additively manufactured article.

[26]

A method for producing a sintered body, the method comprising: applying a liquid containing a binder to the additive manufacturing powder according to any one of aspects [12] to [23] to form a three-dimensional additively manufactured article; and carrying out a sintering treatment on the three-dimensional additively manufactured article.

[27]

An alumina powder, wherein D10 is 1.0 to 4.0 μm, D50 is 5.5 to 9.0 μm, and D90 is 20.0 to 40.0 μm, and a volume ratio of a particle having a particle diameter of 16.8 to 60.0 μm is 15.0 to 22.0% by volume.

[28]

The alumina powder according to aspect [27], wherein a volume ratio of a particles having a particle diameter of 2.0 μm or more is 90.0 to 100% by volume.

[29]

The additive manufacturing powder according to aspect [27] or [28], wherein a ratio of D50 to D10 (D50/D10) is 2.0 to 2.2, and a ratio of D90 to D10 (D90/D10) is 6.0 to 8.0.

[30]

The alumina powder according to any one of aspects [27] to [29], wherein a BET specific surface area is 0.1 to 10.0 m$^2$/g.

[31]

The alumina powder according to any one of aspects [27] to [30], wherein the alumina powder is spherical in shape.

[32]

The alumina powder according to any one of aspects [27] to [31], wherein a press-molding bulk density under a pressure of 98 MPa is 2.52 to 2.54 g/cm$^3$

Advantageous Effects of Invention

According to the present disclosure, it is possible to provide an additive manufacturing powder having appropriate fluidity which achieves both favorable laying property capable of forming a uniform powder layer and shape stability capable of maintaining a shape from application of a binder to a sintering treatment, and an appropriate bulk density which allows a binder to penetrate into powder material and realizes a low shrinkage rate during sintering.

DESCRIPTION OF EMBODIMENTS

Hereinafter, embodiments of the present invention will be described. It should be noted that the embodiments described below are representative examples of the present invention, and are not limited thereto.

In the present specification, when "to" is used for a numerical range, the numerical values at both ends are an upper limit value and a lower limit value, respectively, and are included in the numerical range. When a plurality of upper limit values or lower limit values are described, a numerical range can be created from all combinations of the upper limit values and the lower limit values. Similarly, when a plurality of numerical ranges are described, the upper limit value and the lower limit value can be individually selected and combined from the numerical ranges to create separate numerical ranges.

In the present specification, D10, D50, and D90 are respectively a 10% particle diameter, a 50% particle diameter, and a 90% particle diameter in a volume-based cumulative particle size distribution measured using an electric resistance method particle size distribution measuring apparatus (Beckman Coulter, Inc., MULTISIZER 4) in which an aperture size is set to 100 μm.

In the present specification, the press-molding bulk density means the density of a formed article formed by filling a sample in a circular mold and pressing the sample under a predetermined pressure using a commercially available pressing machine. The press-molding bulk density is a value serving as an index of bulk density of a powder layer when a thin layer of powder is formed by a roller or the like.

In the present specification, the angle of repose is a value measured and calculated according to JIS R 9301-2-2:1999 (alumina powder-Part 2: determination of physical properties-2: angle of repose).

In the present specification, the BET specific surface area is a value measured and calculated in accordance with "6.2 Flow method (3.5) One-point method" of JIS R 1626:1996 (Measuring methods for the specific surface area of fine ceramic powders by gas adsorption using the BET method). The measurement is carried out using the nitrogen gas as an adsorbent after heating the sample to 180° C. as pretreatment, and then allowing a nitrogen gas to flow for 20 minutes.

In the present specification, the circularity is an average value of values calculated by the following formula (1) for 5,000 particles, wherein S is an area of a particle projection, and L is a perimeter of the particle projection.

$$4\pi S/L^2 \tag{1}$$

In the present specification, the volume ratio of the coarse-grained inorganic oxide powder (A) and the fine-grained inorganic oxide powder (B) is a value calculated from the charged mass and true density of the material as follows. The volume VA of the coarse-grained inorganic oxide powder (A) is determined from mass of coarse-grained inorganic oxide powder (A) blended/true density of coarse-grained inorganic oxide powder (A). The volume VB of the fine-grained inorganic oxide powder (B) is determined from mass of fine-grained inorganic oxide powder (B)

blended/true density of fine-grained inorganic oxide powder (B). Using these values, the volume ratio of the coarse-grained inorganic oxide powder (A) is determined from VA/(VA+VB), and the volume ratio of the fine-grained inorganic oxide powder (B) is determined from VB/(VA+VB).

In the present specification, the particle diameter volume ratio is a value calculated by the following formula (2).

$$\text{(Volume ratio of coarse-grained inorganic oxide powder} \tag{2}$$
$$(A) \times D50 \text{ of coarse-grained inorganic oxide powder} (A))/$$
$$\text{(Volume ratio of fine-grained inorganic oxide powder} (B))$$

<Additive Manufacturing Powder>

The additive manufacturing powder is an inorganic oxide powder having a D10 of 1.0 to 4.0 μm, a D50 of 5.5 to 9.0 μm, and a D90 of 20.0 to 40.0 μm. In the additive manufacturing powder, the volume ratio of the particles having a particle diameter of 16.8 to 60.0 μm is 15.0 to 22.0% by volume. The present inventors have found that, in an additive manufacturing powder having a D50 of 5.5 to 9.0 μm, particles having a particle diameter of 16.8 to 60.0 μm contribute to the improvement of fluidity and bulk density of the additive manufacturing powder. Therefore, it has been found that a favorable balance between fluidity and bulk density of the powder material can be achieved by controlling the volume ratio of particles having a particle diameter of 16.8 to 60.0 μm to a specific range.

The D50 of the additive manufacturing powder is 5.5 μm or more, preferably 6.0 μm or more, and more preferably 6.5 μm or more. The D50 of the additive manufacturing powder is 9.0 μm or less, preferably 8.5 μm or less, and more preferably 8.0 μm or less. The D50 of the additive manufacturing powder is 5.5 to 9.0 μm, preferably 6.0 to 8.5 μm, and more preferably 6.5 to 8.0 μm. When the D50 of the additive manufacturing powder is 5.5 μm or more, the shape stability of the powder layer formed from the additive manufacturing powder is favorable, and the shrinkage rate during sintering can be reduced. When the D50 of the additive manufacturing powder is 9.0 μm or less, the bulk density and the fluidity can be within an appropriate range.

The D10 of the additive manufacturing powder is 1.0 μm or more, preferably 2.0 μm or more, and more preferably 3.0 μm or more. The D10 of the additive manufacturing powder is 4.0 μm or less, preferably 3.8 μm or less, and more preferably 3.6 μm or less. The D10 of the additive manufacturing powder is 1.0 to 4.0 μm, preferably 2.0 to 3.8 μm, and more preferably 3.0 to 3.6 μm. When the D10 of the additive manufacturing powder is 1.0 μm or more, the shrinkage rate during sintering can be reduced. When the D10 of the additive manufacturing powder is 4.0 μm or less, the bulk density and the fluidity can be within an appropriate range.

The D90 of the additive manufacturing powder is 20.0 μm or more, preferably 20.5 μm or more, and more preferably 21.0 μm or more. The D90 of the additive manufacturing powder is 40.0 μm or less, preferably 30.0 μm or less, and more preferably 25.0 μm or less. The D90 of the additive manufacturing powder is 20.0 to 40.0 μm, preferably 20.5 to 30.0 μm, and more preferably 21.0 to 25.0 μm. When the D90 of the additive manufacturing powder is 20.0 μm or more, the shape stability of the powder layer formed from the additive manufacturing powder is favorable. When the D90 of the additive manufacturing powder is 40.0 μm or less, the uniformity of the powder layer formed from the additive manufacturing powder is favorable.

The volume ratio of the particles having a particle diameter of 16.8 to 60.0 µm in the additive manufacturing powder is 15.0% by volume or more, preferably 15.5% by volume or more, and more preferably 16.0% by volume or more. The volume ratio of the particles having a particle diameter of 16.8 to 60.0 µm in the additive manufacturing powder is 22.0% by volume or less, preferably 21.0% by volume or less, and more preferably 20.0% by volume or less. The volume ratio of the particles having a particle diameter of 16.8 to 60.0 µm in the additive manufacturing powder is 15.0 to 22.0% by volume, preferably 15.5 to 21.0% by volume, and more preferably 16.0 to 20.0% by volume. When the volume ratio of the particles having a particle diameter of 16.8 to 60.0 µm is within the above ranges, a moderate fluidity of the additive manufacturing powder can be expected. The volume ratio of particles having a particle diameter of 16.8 to 60.0 µm in the additive manufacturing powder is a value determined using an electric resistance method particle size distribution measuring apparatus (Beckman Coulter, Inc., MULTISIZER 4) in which an aperture size is set to 100 µm.

The volume ratio of the particles having a particle diameter of 2.0 µm or more in the additive manufacturing powder is preferably 90.0 to 100% by volume, more preferably 93.0 to 100% by volume, and still more preferably 95.0 to 100% by volume. When the volume ratio of the particles having a particle diameter of 2.0 µm or more is 90.0% by volume or more, the shrinkage rate during sintering can be reduced. The volume ratio of particles having a particle diameter of 2.0 µm or more in the additive manufacturing powder is determined a value by a laser diffraction/scattering particle size distribution measuring apparatus (MicrotracBEL Corporation, MT3300EXII).

The ratio of D50 to D10 (D50/D10) of the additive manufacturing powder is preferably 2.0 to 2.2. When the D50/D10 is within the above range, as an additive manufacturing powder, appropriate fluidity that achieves both favorable laying property capable of forming a uniform powder layer and shape stability capable of maintaining a shape from application of a binder to a sintering treatment can be expected.

The ratio of D90 to D10 (D90/D10) of the additive manufacturing powder is preferably 6.0 or more, more preferably 6.2 or more, and still more preferably 6.5 or more. The ratio of D90 to D10 (D90/D10) of the additive manufacturing powder is preferably 8.0 or less, more preferably 7.5 or less, and still more preferably 7.0 or less. The ratio of D90 to D10 (D90/D10) of the additive manufacturing powder is preferably 6.0 to 8.0, more preferably 6.2 to 7.5, and still more preferably 6.5 to 7.0. When the D90/D10 is 8.0 or less, the particle size distribution of the powder falls within a certain range, and thus fine particles are appropriately arranged around coarse particles, and the appropriate fluidity can be achieved. When the D90/D10 is 6.0 or more, fine particles are appropriately arranged between coarse particles, and the appropriate bulk density can be achieved.

The ratio of D90 to D50 (D90/D50) of the additive manufacturing powder is preferably 2.8 to 3.6, more preferably 2.9 to 3.5, and still more preferably 3.2 to 3.4. When the D90/D50 is 3.6 or less, the particle size distribution of the powder falls within a certain range, and thus fine particles are appropriately arranged around coarse particles, and the appropriate fluidity can be achieved. When the D90/D50 is 2.8 or more, fine particles are appropriately arranged between coarse particles, and the appropriate bulk density can be achieved.

The angle of repose of the additive manufacturing powder is preferably 55 to 58 degrees, and more preferably 56 to 57 degrees. The angle of repose is one of indices indicating the fluidity of the powder. When the angle of repose of the additive manufacturing powder is 55 degrees or more, the shape stability of the powder layer formed from the additive manufacturing powder is favorable. When the angle of repose of the additive manufacturing powder is 58 degrees or less, the additive manufacturing powder can be smoothly supplied to the manufacturing stage and uniformly spread.

The BET specific surface area of the additive manufacturing powder is preferably $0.1 \text{ m}^2/\text{g}$ or more, and more preferably $0.2 \text{ m}^2/\text{g}$ or more. The BET specific surface area of the additive manufacturing powder is preferably $10.0 \text{ m}^2/\text{g}$ or less, more preferably $5.0 \text{ m}^2/\text{g}$ or less, and still more preferably $2.0 \text{ m}^2/\text{g}$ or less. The BET specific surface area of the additive manufacturing powder is preferably $0.1$ to $10.0 \text{ m}^2/\text{g}$, more preferably $0.1$ to $5.0 \text{ m}^2/\text{g}$, and still more preferably $0.2$ to $2.0 \text{ m}^2/\text{g}$. When the BET specific surface area is $0.1 \text{ m}^2/\text{g}$ or more, the shape stability of the powder layer formed from the additive manufacturing powder is favorable. When the BET specific surface area is $10.0 \text{ m}^2/\text{g}$ or less, the additive manufacturing powder can be smoothly supplied to the manufacturing stage and uniformly spread.

The shape of the additive manufacturing powder is not particularly limited. Examples thereof include a spherical shape, an elliptical shape, a scaly shape, and an amorphous shape. Among them, a spherical shape is preferable because an appropriate bulk density is easily obtained. From this viewpoint, the circularity of the additive manufacturing powder is preferably 0.80 or more, more preferably 0.90 or more, and still more preferably 0.95 or more. The upper limit of the circularity of the additive manufacturing powder is not particularly limited, and may be, for example, 1.00 or 0.99. When the circularity is 0.80 or more, the press-molding bulk density can be increased.

The additive manufacturing powder is preferably at least one selected from silica, alumina, zirconia, and titania, more preferably alumina, and more preferably spherical alumina. Alumina is preferable in that it has high thermal conductivity, melting point, and hardness, is inexpensive, and is resistant to acids and alkalis. The volume ratio of alumina in the additive manufacturing powder is preferably 50% by volume or more, more preferably 60% by volume or more, and still more preferably 80% by volume or more. The upper limit of the volume ratio of alumina in the additive manufacturing powder is not particularly limited, and may be, for example, 100% by volume, 98% by volume, or 95% by volume.

When the additive manufacturing powder is alumina, the press-molding bulk density of the additive manufacturing powder under a pressure of 98 MPa is preferably 2.52 to $2.54 \text{ g/cm}^3$. When the press-molding bulk density under a pressure of 98 MPa of the additive manufacturing powder is $2.52 \text{ g/cm}^3$ or more, dimensional stability during sintering is favorable. When the press-molding bulk density under a pressure of 98 MPa of the additive manufacturing powder is $2.54 \text{ g/cm}^3$ or less, the binder easily penetrates into the powder material at the time of applying the binder, and the sufficient strength of the manufactured article and the sintered body can be obtained.

The additive manufacturing powder is suitably used in binder jetting, since it has favorable laying property and shape stability of a powder layer, and appropriate bulk density. The additive manufacturing powder can also be applied to a powder bed fusion in which a powder bed spread with a powder material is irradiated with a laser or an electron beam to selectively melt the powder and manufacture a manufactured article, and other powder additive manufacturing methods.

The additive manufacturing powder can be applied to other applications than the additive manufacturing method. The additive manufacturing powder can be used, for example, as a filler in a coating material, such as a heat dissipation coating material, a heat shielding coating material, or an abrasion resistance coating material, a filler in a thermally conductive resin composition having adhesiveness, or a filler in a thermally conductive coating material having a function of curing in the air.

The inorganic oxide powder of one embodiment is an alumina powder having a D10 of 1.0 to 4.0 μm, a D50 of 5.5 to 9.0 μm, a D90 of 20.0 to 40.0 μm, and a volume ratio of particles having a particle diameter of 16.8 to 60.0 μm of 15.0 to 22.0% by volume.

<Method for Producing Additive Manufacturing Powder>

The additive manufacturing powder can be produced, for example, by mixing a plurality of inorganic oxide powders having different particle size distributions so that the particle size distribution of the additive manufacturing powder falls within a predetermined range. The particle size distribution of the additive manufacturing powder may be adjusted by sieving or the like. The particle size distribution of the additive manufacturing powder can be adjusted to an appropriate range by selecting the type (particle size distribution) and blending amount of inorganic oxide powder to be blended. The method for mixing the materials is not particularly limited, and examples thereof include a method for dry-mixing or wet-mixing the materials. Mixing may be carried out manually or using a blender.

As a more specific method for producing the additive manufacturing powder, for example, a method for mixing the following coarse-grained inorganic oxide powder (A) and the fine-grained inorganic oxide powder (B) in which D50 is smaller than that of the coarse-grained inorganic oxide powder (A) can be mentioned.

[Coarse-Grained Inorganic Oxide Powder (A)]

The D50 of the coarse-grained inorganic oxide powder (A) used is preferably 9.0 to 25.0 μm, more preferably 12.0 to 20.0 μm, and still more preferably 14.0 to 18.0 μm. The D10 of the coarse-grained inorganic oxide powder (A) is preferably 1.0 to 8.0 μm, more preferably 2.0 to 7.5 μm, and still more preferably 3.0 to 7.0 μm. The D90 of the coarse-grained inorganic oxide powder (A) is preferably 28.0 to 40.0 μm, more preferably 28.5 to 38.0 μm, and still more preferably 29.0 to 36.0 μm.

The ratio of D50 to D10 (D50/D10) of the coarse-grained inorganic oxide powder (A) is preferably 1.5 to 3.5, more preferably 1.7 to 3.2, and still more preferably 2.0 to 3.0. The ratio of D90 to D10 (D90/D10) of the coarse-grained inorganic oxide powder (A) is preferably 3.5 to 9.0, more preferably 4.0 to 7.0, and still more preferably 4.5 to 6.0. The ratio of D90 to D50 (D90/D50) of the coarse-grained inorganic oxide powder (A) is preferably 1.7 to 2.3, more preferably 1.8 to 2.2, and still more preferably 1.9 to 2.0.

The shape of the coarse-grained inorganic oxide powder (A) is not particularly limited. Examples thereof include a spherical shape, an elliptical shape, a scaly shape, and an amorphous shape. Among them, a spherical shape is preferable because an appropriate bulk density is easily obtained.

The coarse-grained inorganic oxide powder (A) is preferably at least one selected from silica, alumina, zirconia, and titania, more preferably alumina, and still more preferably spherical alumina. The volume ratio of alumina in the coarse-grained inorganic oxide powder (A) is preferably 50% by volume or more, more preferably 60% by volume or more, and still more preferably 80% by volume or more. The upper limit of the volume ratio of alumina in the coarse-grained inorganic oxide powder (A) is not particularly limited, and may be, for example, 100% by volume, 98% by volume, or 95% by volume.

[Fine-Grained Inorganic Oxide Powder (B)]

The D50 of the fine-grained inorganic oxide powder (B) is smaller than the D50 of the coarse-grained inorganic oxide powder (A). The D50 of the fine-grained inorganic oxide powder (B) used is preferably 5.0 to 8.0 μm, more preferably 5.5 to 7.8 μm, and still more preferably 6.0 to 7.5 μm. The D10 of the fine-grained inorganic oxide powder (B) is preferably 1.0 to 4.0 μm, more preferably 2.0 to 3.8 μm, and still more preferably 2.5 to 3.5 μm. The D90 of the fine-grained inorganic oxide powder (B) is preferably 9.0 to 25.0 μm, more preferably 12.0 to 24.0 μm, and still more preferably 14.0 to 23.0 μm.

The ratio of D50 to D10 (D50/D10) of the fine-grained inorganic oxide powder (B) is preferably 1.5 to 5.0, more preferably 1.7 to 4.0, and still more preferably 1.8 to 3.0. The ratio of D90 to D10 (D90/D10) of the fine-grained inorganic oxide powder (B) is preferably 3.5 to 9.0, more preferably 4.5 to 8.0, and still more preferably 5.5 to 7.0. The ratio of D90 to D50 (D90/D50) of the fine-grained inorganic oxide powder (B) is preferably 2.5 to 3.5, more preferably 2.8 to 3.2, and still more preferably 2.7 to 2.9.

The shape of the fine-grained inorganic oxide powder (B) is not particularly limited. Examples thereof include a spherical shape, an elliptical shape, a scaly shape, and an amorphous shape. Among them, a spherical shape is preferable because an appropriate bulk density is easily obtained.

The fine-grained inorganic oxide powder (B) is preferably at least one selected from silica, alumina, zirconia, and titania, more preferably alumina, and still more preferably spherical alumina. The volume ratio of alumina in the fine-grained inorganic oxide powder (B) is preferably 50% by volume or more, more preferably 60% by volume or more, and still more preferably 80% by volume or more. The upper limit of the volume ratio of alumina in the fine-grained inorganic oxide powder (B) is not particularly limited, and may be, for example, 100% by volume, 98% by volume, or 95% by volume.

The volume ratio of the coarse-grained inorganic oxide powder (A) to the total volume of the coarse-grained inorganic oxide powder (A) and the fine-grained inorganic oxide powder (B) is selected so that the particle size distribution of the additive manufacturing powder falls within an appropriate range, and may be, for example, 9.5 to 29.0% by volume.

<Additive Manufacturing Powder>

In a powder additive manufacturing method in which a powder material is spread by a roller or the like, a press-molding bulk density of the material is important. Inorganic oxide powders having a smaller D50 tend to be less bulky and less flowable than inorganic oxide powders having a larger D50. The present inventors have found that by adding a small amount of the coarse-grained inorganic oxide powder (A) to the fine-grained inorganic oxide powder (B) having a D50 smaller than that of the coarse-grained inorganic oxide powder (A), favorable balance between fluidity and bulk density of the powder material can be achieved.

This is quite different from the design concept of conventional powder materials which attempt to increase the bulk density by filling the fine particles in the gap of the coarse grains.

D50 ($D_A50$) of the coarse-grained inorganic oxide powder (A) and D50 ($D_B50$) of the fine-grained inorganic oxide powder (B) of the additive manufacturing powder preferably satisfy $D_A50-D_B50 \geq 3.5$ μm. When it is within this range, the excellent properties of each of the particles of the coarse-grained inorganic oxide powder (A) and the fine-grained inorganic oxide powder (B) are utilized, and a powder having a favorable balance between fluidity and bulk density can be obtained. From the same viewpoint, $D_A50-D_B50 \geq 5.5$ μm is more preferable, and $D_A50-D_B50 \geq 7.5$ μm is still more preferable. The upper limit of $D_A50-D_B50$ may be 12.0 μm, 15.0 μm, or 19.0 μm.

In the first embodiment, the additive manufacturing powder comprises a coarse-grained inorganic oxide powder (A) having a D50 of 9.0 to 25.0 μm and a fine-grained inorganic oxide powder (B) having a D50 smaller than that of the coarse-grained inorganic oxide powder (A), and the volume ratio of the coarse-grained inorganic oxide powder (A) to the total volume of the coarse-grained inorganic oxide powder (A) and the fine-grained inorganic oxide powder (B) is 9.5 to 29.0% by volume.

In this embodiment, the volume ratio of the coarse-grained inorganic oxide powder (A) to the total volume of the coarse inorganic oxide powder (A) and the fine-grained inorganic oxide powder (B) is 9.5 to 29.0% by volume, preferably 10.5 to 20.0% by volume, and more preferably 11.6 to 15.0% by volume. The volume ratio of the coarse-grained inorganic oxide powder (A) to the total volume of the coarse-grained inorganic oxide powder (A) and the fine-grained inorganic oxide powder (B) is 9.5% by volume or more, preferably 10.5% by volume or more, and more preferably 11.6% by volume or more. The volume ratio of the coarse-grained inorganic oxide powder (A) to the total volume of the coarse-grained inorganic oxide powder (A) and the fine-grained inorganic oxide powder (B) is 29.0% by volume or less, preferably 20.0% by volume or less, and more preferably 15.0% by volume or less. When the volume ratio is 9.5% by volume or more, the bulk density can be increased to a range suitable for an additive manufacturing powder. When the volume ratio is 29.0% by volume or less, the fluidity can be suppressed to a range suitable for an additive manufacturing powder.

In this embodiment, the particle diameter volume ratio of the coarse-grained inorganic oxide powder (A) to the fine-grained inorganic oxide powder (B) is preferably 0.26 to 1.15, more preferably 0.27 to 0.74, and still more preferably 0.29 to 0.32. The particle diameter volume ratio of the coarse-grained inorganic oxide powder (A) to the fine-grained inorganic oxide powder (B) is preferably 0.26 or more, more preferably 0.27 or more, and still more preferably 0.29 or more. The particle diameter volume ratio of the coarse-grained inorganic oxide powder (A) to the fine-grained inorganic oxide powder (B) is preferably 1.15 or less, more preferably 0.74 or less, and still more preferably 0.32 or less. When the particle diameter volume ratio is 0.26 or more, the bulk density can be increased to a range suitable for an additive manufacturing powder. When the particle diameter volume ratio is 1.15 or less, the fluidity can be suppressed to a range suitable for an additive manufacturing powder.

In the second embodiment, the additive manufacturing powder comprises a coarse-grained inorganic oxide powder (A) having a D50 of 9.0 to 25.0 μm and a fine-grained inorganic oxide powder (B) having a D50 smaller than that of the coarse-grained inorganic oxide powder (A), and the particle diameter volume ratio of the coarse-grained inorganic oxide powder (A) to the fine-grained inorganic oxide powder (B) is 0.26 to 1.15.

In this embodiment, the particle diameter volume ratio of the coarse-grained inorganic oxide powder (A) to the fine-grained inorganic oxide powder (B) is 0.26 to 1.15, preferably 0.27 to 0.74, and more preferably 0.29 to 0.32. The particle diameter volume ratio of the coarse-grained inorganic oxide powder (A) to the fine-grained inorganic oxide powder (B) is 0.26 or more, preferably 0.27 or more, and more preferably 0.29 or more. The particle diameter volume ratio of the coarse-grained inorganic oxide powder (A) to the fine-grained inorganic oxide powder (B) is 1.15 or less, preferably 0.74 or less, and more preferably 0.32 or less. When the particle diameter volume ratio is 0.26 or more, the bulk density can be increased to a range suitable for an additive manufacturing powder. When the particle diameter volume ratio is 1.15 or less, the fluidity can be suppressed to a range suitable for an additive manufacturing powder.

In this embodiment, the volume ratio of the coarse-grained inorganic oxide powder (A) to the total volume of the coarse inorganic oxide powder (A) and the fine-grained inorganic oxide powder (B) is preferably 9.5 to 29.00% by volume, more preferably 10.5 to 20.0% by volume, and still more preferably 12.0 to 15.0% by volume. The volume ratio of the coarse-grained inorganic oxide powder (A) to the total volume of the coarse-grained inorganic oxide powder (A) and the fine-grained inorganic oxide powder (B) is preferably 9.5% by volume or more, more preferably 10.5% by volume or more, and still more preferably 12.0% by volume or more. The volume ratio of the coarse-grained inorganic oxide powder (A) to the total volume of the coarse-grained inorganic oxide powder (A) and the fine-grained inorganic oxide powder (B) is preferably 29.0% by volume or less, more preferably 20.0% by volume or less, and still more preferably 15.0% by volume or less. When the volume ratio is 9.5% by volume or more, the bulk density is increased to a range suitable for an additive manufacturing powder. When the volume ratio is 29.0% by volume or less, the fluidity can be suppressed to a range suitable for an additive manufacturing powder.

The D50 of the additive manufacturing powder is preferably 5.5 to 9.0 μm, more preferably 6.0 to 8.5 μm, and still more preferably 6.5 to 8.0 μm. When the D50 of the additive manufacturing powder is 5.5 μm or more, the shape stability of the powder layer formed from the additive manufacturing powder is favorable, and the shrinkage rate during sintering can be reduced. When the D50 of the additive manufacturing powder is 9.0 μm or less, the bulk density and the fluidity can be within an appropriate range.

The D10 of the additive manufacturing powder is preferably 1.0 to 4.0 μm, more preferably 2.0 to 3.8 μm, and still more preferably 3.0 to 3.6 μm. When the D10 of the additive manufacturing powder is 1.0 μm or more, the shrinkage rate during sintering can be reduced. When the D10 of the additive manufacturing powder is 4.0 μm or less, the bulk density and the fluidity can be within an appropriate range.

The D90 of the additive manufacturing powder is preferably 20.0 to 40.0 μm, more preferably 20.5 to 30.0 μm, and still more preferably 21.0 to 25.0 μm. When the D90 of the additive manufacturing powder is 20.0 μm or more, the shape stability of the powder layer formed from the additive manufacturing powder is more favorable. When the D90 of the additive manufacturing powder is 40.0 μm or less, the uniformity of the powder layer formed from the additive manufacturing powder is more favorable.

The volume ratio of the particles having a particle diameter of 16.8 to 60.0 µm in the additive manufacturing powder is preferably 15.0 to 26.0% by volume, more preferably 15.0 to 22.0% by volume, and still more preferably 16.0 to 20.0% by volume. When the volume ratio of the particles having a particle size of 16.8 to 60.0 µm is within the above ranges, a moderate fluidity of the powder material can be expected. The volume ratio of particles having a particle diameter of 16.8 to 60.0 µm in the additive manufacturing powder is a value determined using an electric resistance method particle size distribution measuring apparatus (Beckman Coulter, Inc., MULTISIZER 4) in which an aperture size is set to 100 µm.

The volume ratio of the particles having a particle diameter of 2.0 µm or more in the additive manufacturing powder is preferably 90.0 to 100% by volume, more preferably 93.0 to 100% by volume, and still more preferably 95.0 to 100% by volume. When the volume ratio of the particles having a particle diameter of 2.0 µm or more is 90.0% by volume or more, the shrinkage rate during sintering can be reduced. The volume ratio of particles having a particle diameter of 2.0 µm or more in the additive manufacturing powder is determined a value by a laser diffraction/scattering particle size distribution measuring apparatus (MicrotracBEL Corporation, MT3300EXII).

The ratio of D50 to D10 (D50/D10) of the additive manufacturing powder is preferably 2.0 to 2.2. When the D50/D10 is within the above range, as an additive manufacturing powder, appropriate fluidity that achieves both favorable laying property capable of forming a uniform powder layer and shape stability capable of maintaining a shape from application of a binder to a sintering treatment can be expected.

The ratio of D90 to D10 (D90/D10) of the additive manufacturing powder is preferably 6.0 to 8.0, more preferably 6.2 to 7.5, and still more preferably 6.5 to 7.0. When the D90/D10 is 8.0 or less, the particle size distribution of the powder falls within a certain range, and thus fine particles are appropriately arranged around coarse particles, and the appropriate fluidity can be achieved. When the D90/D10 is 6.0 or more, fine particles are appropriately arranged between coarse particles, and the appropriate bulk density can be achieved.

The ratio of D90 to D50 (D90/D50) of the additive manufacturing powder is preferably 2.8 to 3.6, more preferably 2.9 to 3.5, and still more preferably 3.2 to 3.4. When the D90/D50 is 3.6 or less, the particle size distribution of the powder falls within a certain range, and thus fine particles are appropriately arranged around coarse particles, and the appropriate fluidity can be achieved. When the D90/D50 is 2.8 or more, fine particles are appropriately arranged between coarse particles, and the appropriate bulk density can be achieved.

The angle of repose of the additive manufacturing powder is preferably 55 to 58 degrees, and more preferably 56 to 57 degrees. The angle of repose is one of indices indicating the fluidity of the powder. When the angle of repose of the additive manufacturing powder is 55 degrees or more, the shape stability of the powder layer formed from the additive manufacturing powder is favorable. When the angle of repose of the additive manufacturing powder is 58 degrees or less, the additive manufacturing powder can be smoothly supplied to the manufacturing stage and uniformly spread.

The BET specific surface area of the additive manufacturing powder is preferably 0.1 to 10.0 m²/g, more preferably 0.1 to 5.0 m²/g, and still more preferably 0.2 to 2.0 m²/g. When the BET specific surface area is 0.1 m²/g or more, the shape stability of the powder layer formed from the additive manufacturing powder is favorable. When the BET specific surface area is 10.0 m²/g or less, the additive manufacturing powder can be smoothly supplied to the manufacturing stage and uniformly spread.

The shape of the additive manufacturing powder is not particularly limited. Examples thereof include a spherical shape, an elliptical shape, a scaly shape, and an amorphous shape. Among them, a spherical shape is preferable because an appropriate bulk density is easily obtained. From this viewpoint, the circularity of the additive manufacturing powder is preferably 0.80 or more, more preferably 0.90 or more, and still more preferably 0.95 or more. The upper limit of the circularity of the additive manufacturing powder is not particularly limited, and may be, for example, 1.00 or 0.99. When the circularity is 0.80 or more, the press-molding bulk density can be increased.

The additive manufacturing powder is preferably at least one selected from silica, alumina, zirconia, and titania, more preferably alumina, and more preferably spherical alumina. Alumina is preferable in that it has high thermal conductivity, melting point, and hardness, is inexpensive, and is resistant to acids and alkalis. The volume ratio of alumina in the additive manufacturing powder is preferably 50% by volume or more, more preferably 60% by volume or more, and still more preferably 80% by volume or more. The upper limit of the volume ratio of alumina in the additive manufacturing powder is not particularly limited, and may be, for example, 100% by volume, 98% by volume, or 95% by volume.

When the additive manufacturing powder is alumina, the press-molding bulk density of the additive manufacturing powder under a pressure of 98 MPa is preferably 2.52 to 2.54 g/cm³. When the press-molding bulk density under a pressure of 98 MPa of the additive manufacturing powder is 2.52 g/cm³ or more, dimensional stability during sintering is favorable. When the press-molding bulk density under a pressure of 98 MPa of the additive manufacturing powder is 2.54 g/cm³ or less, the binder easily penetrates into the powder material at the time of applying the binder, and the sufficient strength of the manufactured article and the sintered body can be obtained.

The additive manufacturing powder is suitably used in binder jetting, since it has favorable laying property and shape stability of a powder layer, and appropriate bulk density. The additive manufacturing powder can also be applied to a powder bed fusion in which a powder bed spread with a powder material is irradiated with a laser or an electron beam to selectively melt the powder and manufacture a manufactured article, and other powder additive manufacturing methods.

The additive manufacturing powder can be applied to other applications than the additive manufacturing method. The additive manufacturing powder can be used, for example, as a filler in a coating material, such as a heat dissipation coating material, a heat shielding coating material, or an abrasion resistance coating material, a filler in a thermally conductive resin composition having adhesiveness, or a filler in a thermally conductive coating material having a function of curing in the air.

[Coarse-Grained Inorganic Oxide Powder (A)]

The D50 of the coarse-grained inorganic oxide powder (A) is 9.0 µm or more, preferably 12.0 µm or more, and more preferably 14.0 µm or more. The D50 of the coarse-grained inorganic oxide powder (A) is 25.0 µm or less, preferably 20.0 µm or less, and more preferably 18.0 µm or less. The D50 of the coarse-grained inorganic oxide powder (A) is 9.0 to 25.0 µm, preferably 12.0 to 20.0 µm, and more preferably 14.0 to 18.0 µm. When the D50 of the coarse-grained inorganic oxide powder (A) is 9.0 µm or more, it is easy to fill the additive manufacturing powder at a high density. When the D50 of the coarse-grained inorganic oxide powder (A) is 25.0 µm or less, the angle of repose of the additive manufacturing powder can be controlled to an appropriate range.

The D10 of the coarse-grained inorganic oxide powder (A) is preferably 1.0 to 8.0 m, more preferably 2.0 to 7.5 µm, and still more preferably 3.0 to 7.0 µm. When the D10 of the coarse-grained inorganic oxide powder (A) is 1.0 µm or more, the shrinkage rate during sintering can be reduced. When the D10 of the coarse-grained inorganic oxide powder (A) is 8.0 µm or less, a moderate fluidity of the powder material can be expected.

The D90 of the coarse-grained inorganic oxide powder (A) is preferably 28.0 to 40.0 m, more preferably 28.5 to 38.0 µm, and still more preferably 29.0 to 36.0 µm. When the D90 of the coarse-grained inorganic oxide powder (A) is 28.0 µm or more, the density of a manufactured article formed from the additive manufacturing powder can be increased, and the shape stability is more favorable. When the D90 of the coarse-grained inorganic oxide powder (A) is 40.0 µm or less, the uniformity of the powder layer formed from the additive manufacturing powder is more favorable.

The ratio of D50 to D10 (D50/D10) of the coarse-grained inorganic oxide powder (A) is preferably 1.5 or more, more preferably 1.7 or more, and still more preferably 2.0 or more. The ratio of D50 to D10 (D50/D10) of the coarse-grained inorganic oxide powder (A) is preferably 3.5 or less, more preferably 3.2 or less, and still more preferably 3.0 or less. The ratio of D50 to D10 (D50/D10) of the coarse-grained inorganic oxide powder (A) is preferably 1.5 to 3.5, more preferably 1.7 to 3.2, and still more preferably 2.0 to 3.0. When the D50/D10 is within the above ranges, increased press-molding bulk density can be expected.

The ratio of D90 to D10 (D90/D10) of the coarse-grained inorganic oxide powder (A) is preferably 4.0 or more, more preferably 4.5 or more, and still more preferably 5.0 or more. The ratio of D90 to D10 (D90/D10) of the coarse-grained inorganic oxide powder (A) is preferably 7.0 or less, more preferably 6.0 or less, and still more preferably 5.5 or less. The ratio of D90 to D10 (D90/D10) of the coarse-grained inorganic oxide powder (A) is preferably 4.0 to 7.0, more preferably 4.5 to 6.0, and still more preferably 5.0 to 5.5. When the D90/D10 is within the above ranges, the particle size distribution falls within a certain range, so that it is easy to use as a base material of the additive manufacturing powder, and it is possible to improve the bulk density and the fluidity in a well-balanced manner.

The ratio of D90 to D50 (D90/D50) of the coarse-grained inorganic oxide powder (A) is preferably 1.7 to 2.3, more preferably 1.8 to 2.2, and still more preferably 1.9 to 2.0. When the D90/D50 is within the above ranges, the fluidity of the additive manufacturing powder can be within an appropriate range.

The shape of the coarse-grained inorganic oxide powder (A) is not particularly limited. Examples thereof include a spherical shape, an elliptical shape, a scaly shape, and an amorphous shape. Among them, a spherical shape is preferable because an appropriate bulk density is easily obtained.

The coarse-grained inorganic oxide powder (A) is preferably at least one selected from silica, alumina, zirconia, and titania, more preferably alumina, and still more preferably spherical alumina. The volume ratio of alumina in the coarse-grained inorganic oxide powder (A) is preferably 50% by volume or more, more preferably 60% by volume or more, and still more preferably 80% by volume or more. The upper limit of the volume ratio of alumina in the coarse-grained inorganic oxide powder (A) is not particularly limited, and may be, for example, 100% by volume, 98% by volume, or 95% by volume.

[Fine-Grained Inorganic Oxide Powder (B)]

The D50 of the fine-grained inorganic oxide powder (B) is smaller than the D50 of the coarse-grained inorganic oxide powder (A). The D50 of the fine-grained inorganic oxide powder (B) is preferably 5.0 µm or more, more preferably 5.5 µm or more, and still more preferably 6.0 µm or more. The D50 of the fine-grained inorganic oxide powder (B) is preferably 8.0 µm or less, more preferably 7.8 µm or less, and still more preferably 7.5 µm or less. The D50 of the fine-grained inorganic oxide powder (B) is preferably 5.0 to 8.0 µm, more preferably 5.5 to 7.8 µm, and still more preferably 6.0 to 7.5 µm. When the D50 of the fine-grained inorganic oxide powder (B) is 5.0 µm or more, it is easy to fill the additive manufacturing powder at a high density. When the D50 of the fine-grained inorganic oxide powder (B) is 8.0 µm or less, the angle of repose of the additive manufacturing powder can be increased and the fluidity can be suppressed.

The D10 of the fine-grained inorganic oxide powder (B) is preferably 1.0 to 4.0 µm, more preferably 2.0 to 3.8 µm, and still more preferably 2.5 to 3.5 µm. When the D10 of the fine-grained inorganic oxide powder (B) is within the above ranges, the fine inorganic oxide powder (B) acts as a bearing (bearing effect), and the fluidity can be expected to be within an appropriate range.

The D90 of the fine-grained inorganic oxide powder (B) is preferably 9.0 to 25.0 µm, more preferably 12.0 to 24.0 µm, and still more preferably 14.0 to 23.0 µm. When the D90 of the fine-grained inorganic oxide powder (B) is within the above ranges, a moderate fluidity of the additive manufacturing powder can be expected.

The ratio of D50 to D10 (D50/D10) of the fine-grained inorganic oxide powder (B) is preferably 1.5 to 5.0, more preferably 1.7 to 4.0, and still more preferably 1.8 to 3.0. When the D50/D10 is within the above ranges, an effect of suppressing aggregation between the fine-grained inorganic oxide powders (B) can be expected, and the bulk density of the additive manufacturing powder can be increased.

The ratio of D90 to D10 (D90/D10) of the fine-grained inorganic oxide powder (B) is preferably 3.5 to 9.0, more preferably 4.5 to 8.0, and still more preferably 5.5 to 7.0. When the D90/D10 is within the above ranges, the particle size distribution falls within a certain range, so that it is easy to use as a base material of the additive manufacturing powder, and it is possible to improve the bulk density and the fluidity in a well-balanced manner.

The ratio of D90 to D50 (D90/D50) of the fine-grained inorganic oxide powder (B) is preferably 2.5 to 3.5, more preferably 2.8 to 3.2, and still more preferably 2.7 to 2.9. When the D90/D50 is within the above ranges, the fluidity of the additive manufacturing powder can be within an appropriate range.

The shape of the fine-grained inorganic oxide powder (B) is not particularly limited. Examples thereof include a spherical shape, an elliptical shape, a scaly shape, and an amorphous shape. Among them, a spherical shape is preferable because an appropriate bulk density is easily obtained.

The fine-grained inorganic oxide powder (B) is preferably at least one selected from silica, alumina, zirconia, and titania, more preferably alumina, and still more preferably spherical alumina. The volume ratio of alumina in the fine-grained inorganic oxide powder (B) is preferably 50% by volume or more, more preferably 60% by volume or more, and still more preferably 80% by volume or more. The upper limit of the volume ratio of alumina in the fine-grained inorganic oxide powder (B) is not particularly limited, and may be, for example, 100% by volume, 98% by volume, or 95% by volume.

<Method for Producing Additive Manufacturing Powder>

The additive manufacturing powder can be produced by mixing the coarse-grained inorganic oxide powder (A) and the fine-grained inorganic oxide powder (B). The method for mixing the materials is not particularly limited, and examples thereof include a method for dry-mixing or wet-mixing the coarse-grained inorganic oxide powder (A) and the fine-grained inorganic oxide powder (B). Mixing may be carried out manually or using a blender.

<Method for Producing Three-Dimensional Additively Manufactured Article>

The three-dimensional additively manufactured article can be produced by processing an additive manufacturing powder by a known powder additive manufacturing method. Examples of the powder additive manufacturing method include binder jetting and powder bed fusion. The powder additive manufacturing method generally includes the following steps.

(1) Step of supplying an additive manufacturing powder to a manufacturing stage of powder additive manufacturing apparatus (2) Step of uniformly spreading the supplied additive manufacturing powder with a roller or the like to form a thin layer of the additive manufacturing powder (3) Step of irradiating the formed thin layer of additive manufacturing powder with laser or electron beam to bind additive manufacturing powder, or applying a liquid containing a binder to the formed thin layer of additive manufacturing powder to bind additive manufacturing powder (4) Step of supplying a new additive manufacturing powder on the solidified additive manufacturing powder Thereafter, by repeating steps (2) to (4), a target three-dimensional additively manufactured article can be produced.

As a method for applying a liquid containing a binder, a method for discharging a liquid containing a binder is preferable. The method for discharging the liquid containing the binder is not particularly limited, and examples thereof include a dispenser method, a spray method, and an inkjet method. Among them, the inkjet method is preferable because the quantitativity of the droplets is favorable and a large area can be applied.

When the inkjet method is used, the liquid containing the binder can be applied by an ink jet head having a nozzle for discharging the liquid. As the inkjet head, an ink jet head in a known ink jet printer can be suitably used, and examples thereof include industrial ink jet RICOH MH/GH series (Ricoh Co., Ltd.).

The binder is not particularly limited, but a known binder, such as polyvinyl pyrrolidone, polyvinyl alcohol, polyethylene glycol, polyvinyl butyral, an acrylic resin, or polyamide can be used. The binder can be used by adjusting the viscosity with an appropriate solvent.

<Method for Producing Sintered Body>

A sintered body can be produced by sintering the three-dimensional additively manufactured article by a known sintering method. It is preferable to carry out a degreasing treatment before the sintering treatment. A specific method for producing a sintered body is exemplified below.

The three-dimensional additively manufactured article is placed in a sintering furnace, and the temperature in the furnace is raised to a degreasing treatment temperature. The degreasing treatment temperature can be appropriately set, for example, in the range of 500° C. to 700° C. Thereafter, the temperature in the furnace is maintained at the degreasing treatment temperature for 0.5 to 4 hours to burn an organic component (degreasing treatment). The degreasing time can be set according to the type of binder and the organic component ratio in the three-dimensional additively manufactured article. Next, the temperature in the furnace is raised to a sintering treatment temperature. The sintering treatment temperature can be appropriately set, for example, in the range of 900° C. to 1300° C. Thereafter, the temperature in the furnace is maintained at the sintering treatment temperature for 1 to 7 hours, and the three-dimensional additively manufactured article is sintered to obtain a sintered body (sintering treatment). The sintering temperature and the sintering time can be set according to the type of the inorganic oxide powder.

EXAMPLES

Hereinafter, the present invention will be described more specifically with reference to Examples and Comparative Examples, but the present invention is not limited to the following Examples.

<Materials Used>

Coarse-grained inorganic oxide powder (A): spherical alumina (Alunabeads (trademark)/CB manufactured by Showa Denko K.K.): true density 3.95 $g/m^3$ Coarse-grained inorganic oxide powder (B): spherical alumina (Alunabeads (trademark)/CB manufactured by Showa Denko K.K.): true density 3.95 $g/m^3$ <Evaluation Method>

(Bulk Density)

The bulk density was evaluated by press-molding bulk density under a pressure of 98 MPa. Specifically, the sample was filled in a circular mold (inner diameter 30 mm), and a formed article was produced under a pressure of 98 MPa using a commercially available press machine. The density of the obtained formed article was determined as the press-molding bulk density under a pressure of 98 MPa. When the press-molding bulk density is 2.52 $g/cm^3$ or more, the density of the three-dimensional additively manufactured article is high, so that the shrinkage rate during sintering is lowered, which is preferable. When it is 2.54 $g/cm^3$ or less, a binder can penetrate into the powder material at the time of applying the binder, which is preferable. That is, when the press-molding bulk density was in the range of 2.52 to 2.54 $g/cm^3$, the bulk density was evaluated to be favorable.

(Circularity)

The area S and the perimeter L were measured using FPIA-3000 manufactured by Malvern Panalytical Ltd. As a pretreatment, about 10 g of a sample was placed in a metal sieve having a diameter of 200 mm (opening 25 μm) to remove particles larger than 25 μm with shower water, due to the measurement range of the apparatus. The sample under the sieve was transferred to a plastic container and used as a measured sample. LPF/HPF standard (20×lens) and bright field were used as measurement conditions, and a particle sheath manufactured by the same company was used as a measurement solvent. 2 g of the measured sample was weighed in a 50 mL beaker so that the number of effective analysis was 5000, and the sample was charged into the apparatus using pure water and measured. As data processing after the measurement, data having a plurality of grains on one screen was deleted, and the average circularity was calculated.

(Fluidity)

The fluidity was evaluated by the angle of repose. When the angle of repose is 55 degrees or more, the shape stability (fluidity) is excellent in that the shape can be maintained from application of a binder to a sintering treatment. When the angle is 58 degrees or less, the laying property (fluidity) is excellent in that it is possible to be smoothly supplied to the manufacturing stage, and be uniformly spread. That is, when the angle of repose was 55 to 58 degrees, the fluidity was evaluated to be favorable.

Example 1

The coarse-grained inorganic oxide powder (A) and the fine-grained inorganic oxide powder (B) having the particle diameters and particle diameter ratios described in Table 1 were mixed using a rocking mixer at a ratio so that the volume ratio of the coarse-grained inorganic oxide powder (A) to the total volume of the coarse-grained inorganic oxide powder (A) and the fine-grained inorganic oxide powder (B) was 11.1% by volume, thereby obtaining an additive manufacturing powder. The obtained additive manufacturing powder was evaluated for particle size distribution, BET specific surface area, circularity, fluidity (angle of repose), and press-molding bulk density. The results are shown in Table 2.

Examples 2 to 6 and Comparative Examples 1 to 16

Additive manufacturing powders were obtained in the same manner as in Example 1, except that the coarse-grained inorganic oxide powder (A), the fine-grained inorganic oxide powder (B), and the volume ratio of the coarse-grained inorganic oxide powder (A) to the total volume of the coarse-grained inorganic oxide powder (A) and the fine-grained inorganic oxide powder (B) were changed as shown in Table 1. The obtained additive manufacturing powders were evaluated for particle size distribution, BET specific surface area, circularity, fluidity (angle of repose), and press-molding bulk density. The results are shown in Table 2. Those that were not evaluated are indicated by "–".

TABLE 1

| | Volume ratio of (A) to total volume of (A) and (B) % by volume | Particle diameter volume ratio — | $D_A50$-$D_B50$ — | Coarse-grained inorganic oxide powder (A) | | | | | | Fine-grained inorganic oxide powder (B) | | | $D50/D10$ — | $D90/D10$ — | $D90/D50$ — |
|---|---|---|---|---|---|---|---|---|---|---|---|---|---|---|---|
| | | | | D10 μm | D50 μm | D90 μm | D50/D10 — | D90/D10 — | D90/D50 — | D10 μm | D50 μm | D90 μm | | | |
| Ex. 1 | 11.1 | 0.28 | 8.5 | 6.0 | 15.3 | 29.6 | 2.6 | 5.0 | 1.9 | 3.3 | 6.8 | 21.0 | 2.1 | 6.4 | 3.1 |
| Ex. 2 | 11.1 | 0.28 | 8.6 | 6.2 | 15.7 | 30.9 | 2.6 | 5.0 | 2.0 | 3.4 | 7.1 | 20.8 | 2.1 | 6.2 | 2.9 |
| Ex. 3 | 11.1 | 0.30 | 9.6 | 6.4 | 16.4 | 31.4 | 2.6 | 4.9 | 1.9 | 3.3 | 6.8 | 20.5 | 2.1 | 6.3 | 3.0 |
| Ex. 4 | 12.2 | — | 9.0 | — | 15.5 | — | — | — | — | — | 6.5 | — | — | — | — |
| Ex. 5 | 12.2 | 0.31 | 8.0 | 5.7 | 14.5 | 29.0 | 2.5 | 5.1 | 2.0 | 3.1 | 6.5 | 20.2 | 2.1 | 6.5 | 3.1 |
| Ex. 6 | 25.0 | 0.95 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 1 | 0.0 | — | — | — | — | — | — | — | — | 2.4 | 4.9 | 9.2 | 2.0 | 3.9 | 1.9 |
| Comp. Ex. 2 | 0.0 | — | — | — | — | — | — | — | — | 3.4 | 6.4 | 10.5 | 1.9 | 3.1 | 1.6 |
| Comp. Ex. 3 | 0.0 | — | — | — | — | — | — | — | — | 3.2 | 6.6 | 19.9 | 2.1 | 6.2 | 3.0 |
| Comp. Ex. 4 | 0.0 | — | — | — | — | — | — | — | — | 3.3 | 6.7 | 21.4 | 2.1 | 6.6 | 3.2 |
| Comp. Ex. 5 | 0.0 | — | — | — | — | — | — | — | — | 3.2 | 6.4 | 18.7 | 2.0 | 5.9 | 2.9 |
| Comp. Ex. 6 | 0.0 | — | — | — | — | — | — | — | — | 3.2 | 6.5 | 18.4 | 2.0 | 5.7 | 2.8 |
| Comp. Ex. 7 | 0.0 | — | — | — | — | — | — | — | — | 3.1 | 6.3 | 18.6 | 2.0 | 5.9 | 3.0 |
| Comp. Ex. 8 | 3.2 | 0.09 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 9 | 5.0 | 0.14 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 10 | 6.3 | 0.19 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 11 | 7.7 | 0.24 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 12 | 33.3 | 1.42 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 13 | 50.0 | 2.84 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 14 | 66.7 | 5.68 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 15 | 75.0 | 8.51 | 11.2 | 5.7 | 17.3 | 31.1 | 3.0 | 5.4 | 1.8 | 3.1 | 6.1 | 15.6 | 2.0 | 5.1 | 2.6 |
| Comp. Ex. 16 | 100.0 | — | — | 6.3 | 16.6 | 33.9 | 2.6 | 5.4 | 2.0 | — | — | — | — | — | — |

TABLE 2

| | D10 µm | D50 µm | D90 µm | D50/D10 — | D90/D10 — | D90/D50 — | Volume ratio of particle having particle diameter of 16.8 to 60.0 µm % by volume | Volume ratio of particle having particle diameter of 2.0 µm or more % by volume | BET specific surface area m2/g | Circularity — | Angle of repose degrees | Press-molding bulk density g/cm3 |
|---|---|---|---|---|---|---|---|---|---|---|---|---|
| Ex. 1 | 3.3 | 6.8 | 22.5 | 2.1 | 6.9 | 3.3 | 16.6 | 95.3 | 0.5 | 0.95 | 56 | 2.52 |
| Ex. 2 | 3.4 | 7.1 | 21.2 | 2.1 | 6.3 | 3.0 | 16.4 | 95.8 | 0.5 | 0.96 | 57 | 2.53 |
| Ex. 3 | 3.4 | 7.4 | 23.2 | 2.2 | 6.8 | 3.1 | 17.2 | — | — | 0.96 | 58 | 2.52 |
| Ex. 4 | 3.2 | 6.9 | 24.5 | 2.1 | 7.6 | 3.6 | 19.0 | 95.5 | 0.5 | 0.96 | 55 | 2.54 |
| Ex. 5 | 3.2 | 6.9 | 22.9 | 2.1 | 7.0 | 3.3 | 17.5 | 95.6 | 0.4 | 0.95 | 55 | 2.53 |
| Ex. 6 | 3.5 | 6.9 | 21.2 | 2.0 | 6.1 | 3.0 | 16.3 | 96.4 | 0.4 | — | 57 | 2.53 |
| Comp. Ex. 1 | 2.4 | 4.9 | 9.2 | 2.1 | 3.9 | 1.9 | 0.0 | — | — | 0.96 | 52 | 2.38 |
| Comp. Ex. 2 | 3.4 | 6.4 | 10.5 | 1.9 | 3.1 | 1.6 | 1.2 | — | — | — | 59 | 2.42 |
| Comp. Ex. 3 | 3.2 | 6.6 | 19.9 | 2.1 | 6.2 | 3.0 | 13.7 | — | — | 0.96 | 57 | 2.51 |
| Comp. Ex. 4 | 3.3 | 6.7 | 21.4 | 2.1 | 6.6 | 3.2 | 14.7 | — | — | — | — | 2.50 |
| Comp. Ex. 5 | 3.2 | 6.4 | 18.7 | 2.0 | 5.9 | 2.9 | 12.2 | — | — | — | — | 2.48 |
| Comp. Ex. 6 | 3.2 | 6.5 | 18.4 | 2.0 | 5.7 | 2.8 | 11.8 | — | — | — | — | 2.47 |
| Comp. Ex. 7 | 3.1 | 6.3 | 18.6 | 2.0 | 5.9 | 3.0 | 11.9 | — | — | — | 56 | 2.47 |
| Comp. Ex. 8 | 3.3 | 6.3 | 16.2 | 1.9 | 4.9 | 2.6 | 9.3 | — | — | — | 58 | 2.46 |
| Comp. Ex. 9 | 3.3 | 6.3 | 16.0 | 1.9 | 4.8 | 2.6 | 8.8 | — | — | 0.96 | 60 | 2.47 |
| Comp. Ex. 10 | 3.3 | 6.3 | 18.4 | 1.9 | 5.5 | 2.9 | 12.3 | — | — | — | 60 | 2.48 |
| Comp. Ex. 11 | 3.4 | 6.4 | 19.7 | 1.9 | 5.9 | 3.1 | 13.7 | — | — | — | 51 | 2.48 |
| Comp. Ex. 12 | 3.5 | 7.9 | 25.6 | 2.3 | 7.3 | 3.2 | 22.5 | — | — | — | 58 | 2.56 |
| Comp. Ex. 13 | 3.7 | 9.3 | 25.9 | 2.5 | 7.0 | 2.8 | 28.7 | — | — | — | 55 | 2.60 |
| Comp. Ex. 14 | 4.0 | 12.0 | 30.0 | 3.0 | 7.5 | 2.5 | 36.8 | — | — | — | 55 | 2.63 |
| Comp. Ex. 15 | 4.2 | 13.7 | 29.8 | 3.3 | 7.1 | 2.2 | 41.1 | — | — | — | 44 | 2.64 |
| Comp. Ex. 16 | 6.3 | 16.6 | 33.9 | 2.6 | 5.4 | 2.0 | 49.3 | — | — | 0.97 | 36 | 2.56 |

Examples 1 to 6 have an angle of repose in the range of 55 to 58 degrees and have moderate fluidity. Therefore, it is considered that in the case of being used in binder jetting, a uniform powder layer can be formed when a thin layer of the additive manufacturing powder is formed, and the shape can be maintained from application of a binder to a sintering treatment. In addition, Examples 1 to 6 have a press-molding bulk density in the range of 2.52 to 2.54 g/cm³ and have moderate press-molding bulk density. Therefore, it is considered that in the case of being used in binder jetting, a binder can penetrate into the powder materials, and a low shrinkage rate during sintering can be realized.

INDUSTRIAL APPLICABILITY

By using the additive manufacturing powder of one embodiment, a manufactured article with less voids can be produced in the additive manufacturing method in which a liquid binder is injected to spread powder material to solidify it (binder jetting), so that an effect of reducing the heat shrinkage during a sintering treatment of the manufactured article can be expected.

The invention claimed is:

1. An additive manufacturing powder that is an inorganic oxide powder, wherein D10 is 1.0 to 4.0 µm, D50 is 5.5 to 9.0 µm, and D90 is 20.0 to 40.0 µm, and a volume ratio of a particle having a particle diameter of 16.8 to 60.0 µm is 15.0 to 22.0% by volume.

2. The additive manufacturing powder according to claim 1, wherein a volume ratio of a particle having a particle diameter of 2.0 µm or more is 90.0 to 100% by volume.

3. The additive manufacturing powder according to claim 1, wherein a ratio of D50 to D10 (D50/D10) is 2.0 to 2.2, and a ratio of D90 to D10 (D90/D10) is 6.0 to 8.0.

4. The additive manufacturing powder according to claim 1, wherein a BET specific surface area is 0.1 to 10.0 m2/g.

5. The additive manufacturing powder according to claim 1, wherein the powder is spherical in shape.

6. The additive manufacturing powder according to claim 1, which is alumina.

7. The additive manufacturing powder according to claim 6, wherein a press-molding bulk density under a pressure of 98 MPa is 2.52 to 2.54 g/cm³.

8. The additive manufacturing powder according to claim 1 for use in binder jetting.

9. A sintered body of the additive manufacturing powder according to claim 1.

10. A method for producing a binder-jet additively manufactured article, the method comprising: applying a liquid containing a binder to the additive manufacturing powder according to claim 1 to form a three-dimensional additively manufactured article.

11. A method for producing a sintered body, the method comprising: applying a liquid containing a binder to the additive manufacturing powder according to claim 1 to form a three-dimensional additively manufactured article; and carrying out a sintering treatment on the three-dimensional additively manufactured article.

12. An alumina powder, wherein D10 is 1.0 to 4.0 µm, D50 is 5.5 to 9.0 µm, and D90 is 20.0 to 40.0 µm, and a volume ratio of a particle having a particle diameter of 16.8 to 60.0 µm is 15.0 to 22.0% by volume.

* * * * *